(12) United States Patent
Clayton (10) Patent No.: US 10,834,913 B2
(45) Date of Patent: Nov. 17, 2020

(54) FISHING GARMENT SYSTEM (71) Applicant: W. Harry Clayton, Spartanburg, SC (US)

(72) Inventor: W. Harry Clayton, Spartanburg, SC (US)

(*) Notice: Subject to any disclaimer, the term of this patent is extended or adjusted under 35 U.S.C. 154(b) by 102 days.

(21) Appl. No.: 15/900,130

(22) Filed: Feb. 20, 2018

(65) Prior Publication Data
US 2019/0254269 A1   Aug. 22, 2019

(51) Int. Cl.
| | |
|---|---|
| *A01K 97/10* | (2006.01) |
| *A41D 3/00* | (2006.01) |
| *A41D 1/08* | (2018.01) |
| *A41B 1/08* | (2006.01) |
| *A41D 27/20* | (2006.01) |
| *A41D 1/089* | (2018.01) |

(52) U.S. Cl.
CPC ............... *A01K 97/10* (2013.01); *A41B 1/08* (2013.01); *A41D 1/08* (2013.01); *A41D 1/089* (2018.01); *A41D 3/00* (2013.01); *A41D 27/20* (2013.01); *A41D 2600/106* (2013.01)

(58) Field of Classification Search
CPC .. A01K 97/10; A41D 27/20; A41D 2600/106; A41D 1/08; A41D 1/089; A41D 3/00
See application file for complete search history.

(56) References Cited

U.S. PATENT DOCUMENTS

| | | | | |
|---|---|---|---|---|
| 3,115,997 A | * | 12/1963 | Hengst | A01K 97/10 224/575 |
| 4,081,115 A | * | 3/1978 | White | A01K 97/10 224/200 |
| 4,630,319 A | * | 12/1986 | Mathis | A41D 27/20 2/250 |
| 5,105,574 A | * | 4/1992 | Fast | A01K 97/10 43/21.2 |
| 5,386,932 A | * | 2/1995 | Gross | A01K 97/10 224/200 |
| 5,636,377 A | * | 6/1997 | Wiener | A41D 13/015 2/2.5 |
| 5,992,814 A | * | 11/1999 | Allord | A01K 97/10 224/200 |

(Continued)

FOREIGN PATENT DOCUMENTS

| | | |
|---|---|---|
| AU | 2017100696 | 7/2017 |
| CN | 202425627 | 9/2012 |

(Continued)

OTHER PUBLICATIONS

Icuerius Novelty Search Fishing Rod Gimbals Integrated Clothings, Nov. 10, 2017, 31 pages.

*Primary Examiner* — Shaun R Hurley
*Assistant Examiner* — Bao-Thieu L Nguyen
(74) *Attorney, Agent, or Firm* — Dority & Manning, P.A.

(57) ABSTRACT

A fishing garment system can include a fabric garment having a pocket with an opening. A gimbal plate is disposed within the pocket of the fabric garment such that the gimbal plate is positioned for supporting a fishing rod. The gimbal plate is removable from the pocket of the fabric garment through the opening of the pocket. The fishing garment system can also include a belt with features for supporting a fishing rod.

15 Claims, 10 Drawing Sheets

(56) References Cited

U.S. PATENT DOCUMENTS

| | | | | |
|---|---|---|---|---|
| 6,021,983 | A * | 2/2000 | Congdon | G02B 23/18 224/909 |
| 6,185,856 | B1 * | 2/2001 | Yakabe | A01K 97/10 224/200 |
| 6,209,253 | B1 * | 4/2001 | Saldana, Jr. | A01K 97/10 224/200 |
| 6,532,599 | B1 * | 3/2003 | Dugan | A41D 13/0575 2/228 |
| 6,859,943 | B1 | 3/2005 | Wallace, III | |
| 7,661,152 | B2 * | 2/2010 | Manzano-Rivera | A61M 25/02 2/114 |
| 7,712,154 | B1 * | 5/2010 | Adams-Zarrella | A41D 27/20 2/227 |
| 8,690,035 | B2 * | 4/2014 | Silverman | A01K 97/10 224/261 |
| 9,066,507 | B2 * | 6/2015 | Silverman | A45F 5/00 |
| 9,980,525 | B2 * | 5/2018 | Hanna | F41H 1/02 |
| 2004/0158913 | A1 * | 8/2004 | Goodwin | A41D 13/0506 2/267 |
| 2005/0091730 | A1 * | 5/2005 | Stanko | A41D 13/0012 2/250 |
| 2007/0017147 | A1 * | 1/2007 | Manzo | A01K 97/06 43/57.1 |
| 2007/0044366 | A1 | 3/2007 | Walko | |
| 2008/0222766 | A1 * | 9/2008 | Arensdorf | A41D 1/08 2/22 |
| 2010/0018104 | A1 | 1/2010 | Pedersen et al. | |
| 2010/0043123 | A1 * | 2/2010 | Goodhand | A41D 13/0015 2/228 |
| 2011/0185470 | A1 * | 8/2011 | Jones | A41D 27/20 2/69 |
| 2013/0061514 | A1 * | 3/2013 | Smith | A01K 97/10 43/54.1 |
| 2013/0067642 | A1 * | 3/2013 | Chen | A41C 1/10 2/300 |
| 2014/0373259 | A1 * | 12/2014 | Bergeron | A41D 13/015 2/455 |
| 2015/0231483 | A1 * | 8/2015 | Rudow | A63B 71/1225 2/24 |
| 2015/0257459 | A1 * | 9/2015 | Cockram | A41D 27/20 2/212 |
| 2015/0342331 | A1 | 12/2015 | Tom | |
| 2016/0008175 | A1 * | 1/2016 | Bergman | A61F 9/04 2/171.2 |
| 2016/0021953 | A1 * | 1/2016 | Turner | A41D 13/015 2/22 |
| 2016/0033235 | A1 * | 2/2016 | Kinnings | F41H 1/02 2/102 |
| 2016/0095372 | A1 * | 4/2016 | Peterson | A41D 27/201 2/248 |
| 2016/0206021 | A1 * | 7/2016 | Gawrys | A41D 13/1254 |
| 2017/0105401 | A1 * | 4/2017 | Nethers | A01K 97/10 |
| 2017/0231307 | A1 * | 8/2017 | Dennard | A41F 9/002 2/322 |
| 2018/0049493 | A1 * | 2/2018 | Graves | A41D 27/20 |
| 2018/0110271 | A1 * | 4/2018 | Lee | A41D 27/208 |
| 2018/0295904 | A1 * | 10/2018 | Looper | A41D 13/02 |

FOREIGN PATENT DOCUMENTS

| | | |
|---|---|---|
| JP | 2001037391 | 2/2001 |
| JP | 2004225196 | 8/2004 |
| KR | 20140143008 | 12/2014 |

* cited by examiner

FISHING GARMENT SYSTEM

FIELD OF THE INVENTION

The present subject matter relates generally to fishing garments.

BACKGROUND OF THE INVENTION

Fishing frequently requires an angler to pull on a rod while reeling in a fish. This can be uncomfortable when reeling in large fish over an extended period of time. To make reeling in large fish more comfortable, anglers frequently utilize a gimbal belt to support the rod. The angler can wear the gimbal belt and rest an end of the rod on the gimbal belt. When a fish is hooked, the gimbal belt distributes force applied to the angler. Thus, using a gimbal belt increases the angler's comfort compared to fishing without the gimbal belt.

Known gimbal belts have drawbacks. For example, certain gimbal belts are large and bulky and must be strapped to the angler. Such gimbal belts can be uncomfortable to wear for extended periods of time and can look awkward. Wearing a large, bulky fishing gimbal belt is often not desirable except during offshore deep sea fishing away from the general public. In addition, wearing such gimbal belts while reeling in items other than fish can be excessive. For example, when reeling in after losing bait or to remove seaweed, assistance with distributing the load on the rod may be useful, but an angler may hesitate to utilize a gimbal belt in such situations due to the discomfort.

BRIEF DESCRIPTION OF THE INVENTION

The present subject matter provides a fishing garment system. The fishing garment system includes a fabric garment and a gimbal plate. The gimbal plate is sized such that the gimbal plate may be positioned within a pocket of the fabric garment. The gimbal plate is positioned for supporting a fishing rod against a wearer of the fabric garment when the gimbal plate is disposed within the pocket of the fabric garment. Additional aspects and advantages of the invention will be set forth in part in the following description, or may be apparent from the description, or may be learned through practice of the invention.

In a first example embodiment, a fishing garment system includes a fabric garment having a pocket with an opening. A gimbal plate is sized such that the gimbal plate is selectively positionable within the pocket of the fabric garment by inserting the gimbal plate through the opening of the pocket. The gimbal plate is positioned for supporting a fishing rod against a wearer of the fabric garment when the gimbal plate is disposed within the pocket of the fabric garment.

In a second example embodiment, a fishing garment system includes a fabric garment having a pocket with an opening. A gimbal plate is disposed within the pocket of the fabric garment such that the gimbal plate is positioned for supporting a fishing rod. The gimbal plate is removable from the pocket of the fabric garment through the opening of the pocket.

In a third example embodiment, a fishing garment system includes a belt having a pocket with an opening. A gimbal plate is sized such that the gimbal plate is selectively positionable within the pocket of the belt by inserting the gimbal plate through the opening of the pocket. The gimbal plate is positioned for supporting a fishing rod against a wearer of the belt when the gimbal plate is disposed within the pocket of the belt.

In a fourth example embodiment, a fishing garment includes an elongated belt with a buckle. The elongated belt has a width between a top and a bottom of the elongated belt. The width of the elongated belt is less than one and a half inches. A support bar is mounted to the elongated belt between the top and the bottom of the elongated belt. The support bar is positioned and oriented on the elongated belt such that the support bar is receivable within a gimbal on an end of a fishing rod.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
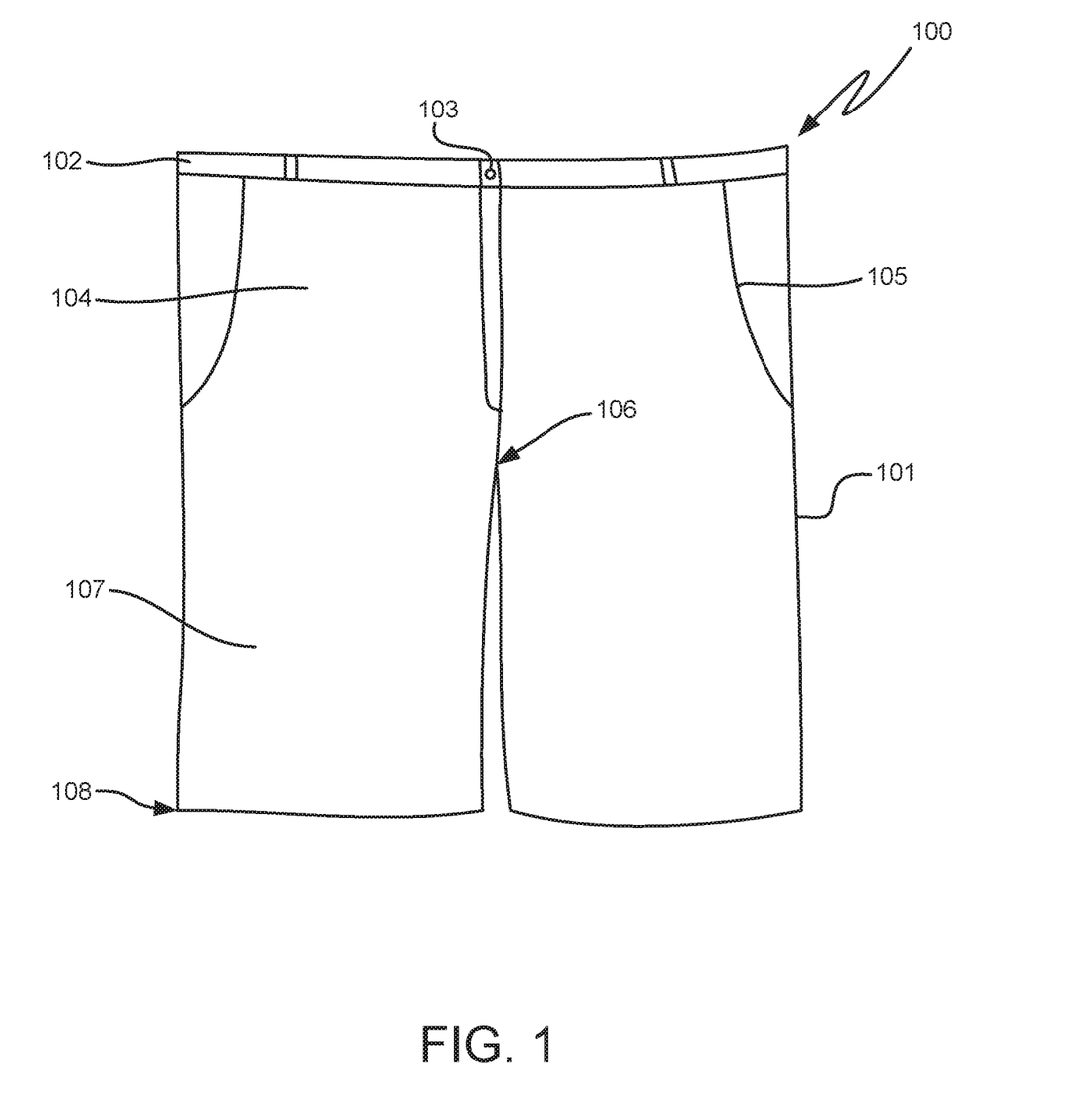
FIG. 1 is a front view of a fishing garment system according to an example embodiment of the present subject matter.

FIG. 1 is a front view of a fishing garment system 100 according to an example embodiment of the present subject matter. As may be seen in FIG. 1, fishing garment system 100 includes a fabric garment 101. In the example embodiment shown in FIG. 1, the fabric garment 101 is a pair of shorts. However, it will be understood that fabric garment 101 may be another suitable type of fabric garment in alternative example embodiments. For example, fabric garment 101 may be a jacket, a pair of pants, a shirt, a vest, etc. Thus, while described in greater detail below in the context of a pair of shorts, fabric garment 101 is not limited to such particular fabric cut and arrangement.

With reference to FIG. 1, various components of fabric garment 101 are constructed in a conventional manner. For example, fabric garment 101 includes a waistband 102 that is fastened with a button 103. The fabric garment 101 may also include belt loops at the waistband 102 as shown in FIG. 1. Further, the fabric garment 101 may include a rise 104 that extends between waistband 102 of fabric garment 101 and a crotch 106 of fabric garment 101. Thus, e.g., rise 104 may be positioned between waistband 102 and crotch 106 of fabric garment 101, e.g., along a vertical direction. The rise 104 may include a fly as shown in FIG. 1 that joins the left and right sides of rise 104, e.g., directly above crotch 106.

Adjacent the waistband 102, fabric garment 101 includes a pair of hand pockets 105. Each of the hand pockets 105 is positioned at a respective, opposite side of fabric garment 101, e.g., such that fabric garment 101 includes a left hand pocket and a right hand pocket. Fabric garment 101 also includes a pair of legs 107. Legs 107 extend downwardly from crotch 106 to a hem 108. When fabric garment 101 is worn by an angler, waistband 102 sits on or at a waist of the angler, and the legs of the angler are positioned within the legs 107.

Fabric garment 101 may be constructed of various materials. For example, fabric garment 101 may be constructed of or with cotton, nylon, polyester, etc. Various panels of such material may be stitched together to form fabric garment 101, and fabric garment 101 may be constructed in various sizes.

As discussed in greater detail below, fishing garment system 100 includes features for supporting a fishing pole or rod 50 (FIG. 4) against a wearer of fabric garment 101. Thus, fishing garment system 100 may assist the wearer with more comfortably fishing. In particular, fishing garment system 100 includes features for supporting a gimbal plate 120 (FIG. 2) within fabric garment 101. The wearer of fabric garment 101 may rest an end 52 (FIG. 4) of fishing rod 50 on or against the gimbal plate 120, and the gimbal plate 120 may increase the area against which the weight of the fishing rod 50 and any load on the fishing rod 50 is applied to the wearer of fabric garment 101. Thus, e.g., the wearer of fishing garment system 100 may fish more comfortably compared to without the gimbal plate 120. In particular, the gimbal plate 120 may allow more comfortable reeling in after losing bait or to remove seaweed compared to known gimbal belts.

Figure 2:
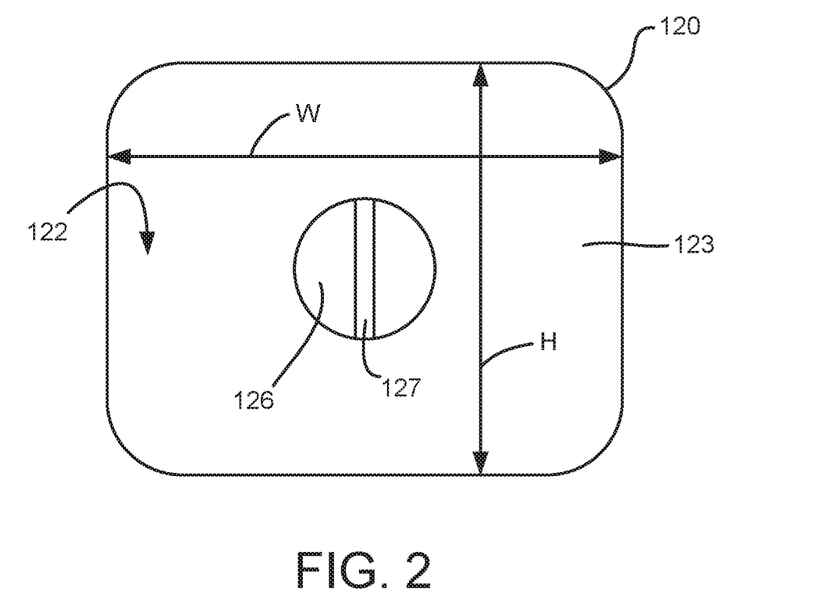
FIG. 2 is a front view of a gimbal plate according to an example embodiment of the present subject matter and that is configured for use in the example fishing garment system of FIG. 1.
Figure 3:
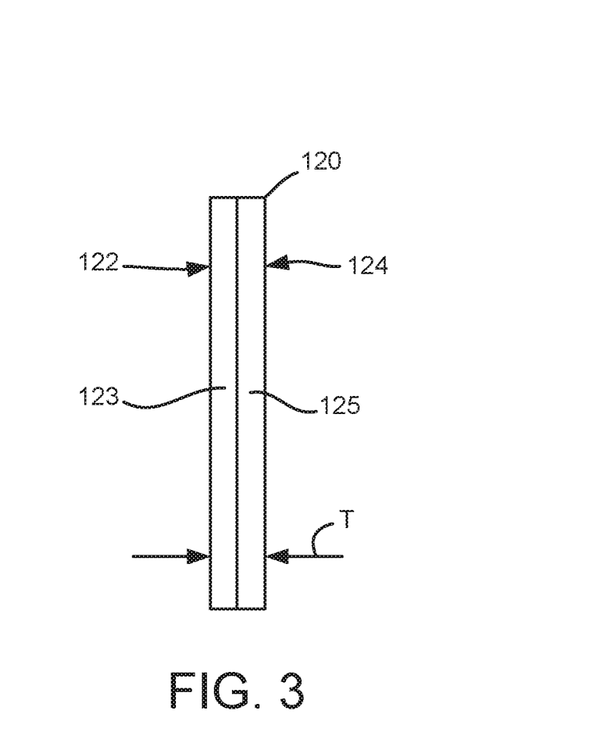
FIG. 3 is a side view of the example gimbal plate of FIG. 2.

FIG. 2 is a front view of gimbal plate 120 according to an example embodiment of the present subject matter. FIG. 3 is a side view of gimbal plate 120. As may be seen in FIGS. 2 and 3, gimbal plate 120 extends between an outer surface 122 and an inner surface 124. Outer surface 122 of gimbal plate 120 faces away from the wearer of fabric garment 101 and inner surface 124 of gimbal plate 120 faces towards the wearer of fabric garment 101 when gimbal plate 120 is disposed within fabric garment 101.

Gimbal plate 120 may include a first layer 123 and a second layer 125. It will be understood that while shown with two layers 123, 125, gimbal plate 120 may include only first layer 123 in certain example embodiments. In addition, gimbal plate 120 may include more than two layers in alternative example embodiments, e.g., one, two, three, or more additional layers.

First and second layers 123, 125 of gimbal plate 120 may be constructed of or with different materials. For example, first layer 123 of gimbal plate 120 may be harder than second layer 125 of gimbal plate 120. Thus, e.g., first layer 123 of gimbal plate 120 may be constructed of or with a rigid wood, plastic or metal. In particular, first layer 123 of gimbal plate 120 may have a hardness of no less than 50D on the Shore D scale. Thus, e.g., first layer 123 of gimbal plate 120 may rigid to support the end 52 of the fishing rod 50 without excessive deformation in order to facilitate applying the load from the fishing rod 50 onto a large area of the wearer of fabric garment 101.

In contrast to first layer 123, second layer 125 of gimbal plate 120 may be constructed of or with a relatively soft material. For example, second layer 125 of gimbal plate 120 may be constructed of or with a gel or plastic foam, such as polyurethane foam, polyethylene foam, neoprene foam, ethylene-vinyl acetate foam, etc. Thus, second layer 125 of gimbal plate 120 may act as a foam backing for the rigid first layer 123 of gimbal plate 120. In such a manner, second layer 125 of gimbal plate 120 may increase the comfort of the wearer of fishing garment system 100, particularly when reeling in, by acting as a padding or shock absorber.

Gimbal plate 120 may be sized to comfortably support the end 52 of the fishing rod 50. For example, as shown in FIG. 2, gimbal plate 120 has a height H between a top and a bottom of the gimbal plate 120. Thus, gimbal plate 120 may extend vertically by the height H of gimbal plate 120. In addition, gimbal plate 120 has a width W between a first side and a second side of the gimbal plate 120. Thus, gimbal plate 120 may extend laterally by the width W of gimbal plate 120. The height H and the width W of gimbal plate 120 may be selected to advantageously transfer the load of the fishing rod 50 to the wearer of the fishing garment system 100 while also being discreet. For example, the height H of gimbal plate 120 may be no less than two (2) inches and no greater than six (6) inches, and the width W of gimbal plate 120 may be no less than two (2) inches and no greater than twelve (12) inches. As another example, the area of the inner surface 124 of gimbal plate 120 may be no less than four square inches (4 in$^2$) and no greater than twenty square inches (20 in$^2$). Such sizing of gimbal plate 120 may provide a large force transfer area between the fishing rod 50 and the wearer of the fishing garment system 100 while also not being overly bulky and conspicuous. Thus, gimbal plate 120 may be sized to allow a user to avoid the awkward appearance of known fishing gimbal belts.

As shown in FIG. 3, gimbal plate 120 may also have a thickness T between outer and inner surfaces 122, 124 of gimbal plate 120. Like the height H and the width W of gimbal plate 120 discussed above, the thickness T of gimbal plate 120 may be selected to advantageously transfer the load of the fishing rod 50 to the wearer of the fishing garment system 100 while also being descript. For example, the thickness T of gimbal plate 120 may be no less than one eighth (⅛) inch inches and no greater than one (1) inch. Such sizing of gimbal plate 120 may provide support for the fishing rod 50 against the wearer of the fishing garment system 100 while also not being overly bulky and conspicuous. Thus, gimbal plate 120 may be sized to allow a user to avoid the awkward appearance of known fishing gimbal belts.

Referring back to FIG. 2, gimbal plate 120 (e.g., first layer 123 of gimbal plate 120) may define a recess 126. Recess 126 is shaped and sized to support the end 52 of the fishing rod 50. Thus, e.g., the wearer of fishing garment system 100 may position the end 52 of the fishing rod 50 within the recess 126, and interference between the end 52 of the fishing rod 50 and the gimbal plate 120 at recess 126 may assist with limiting or preventing slipping between the end 52 of the fishing rod 50 and the gimbal plate 120. As shown in FIG. 2, recess 126 may be circular in certain example embodiments.

In certain example embodiments, recess 126 includes a support bar 127. Support bar 127 is sized and oriented for receipt within a slot formed by a gimbal on the end 52 of the fishing rod 50. The wearer of fishing garment system 100 may position the slot on the end 52 of the fishing rod 50 on the support bar 127, and interference between the end 52 of the fishing rod 50 and the support bar 127 may assist with limiting or preventing slipping between the end 52 of the fishing rod 50 and the gimbal plate 120. As shown in FIG. 2, support bar 127 may be vertically oriented in certain example embodiments. Support bar 127 may be horizontally or otherwise suitably oriented in alternative example embodiments.

In FIG. 3, inner surface 124 of gimbal plate 120 is shown as a flat planar surface. In alternative example embodiments, inner surface 124 of gimbal plate 120 may be arcuate or curved. In particular, inner surface 124 of gimbal plate 120 may be shaped complementary to the wearer of fishing garment system 100. For example, inner surface 124 of gimbal plate 120 may be shaped complementary to an upper thigh of the wearer. Thus, inner surface 124 of gimbal plate 120 may be arcuate or curved in a plate that is perpendicular to vertical.

Figure 4:
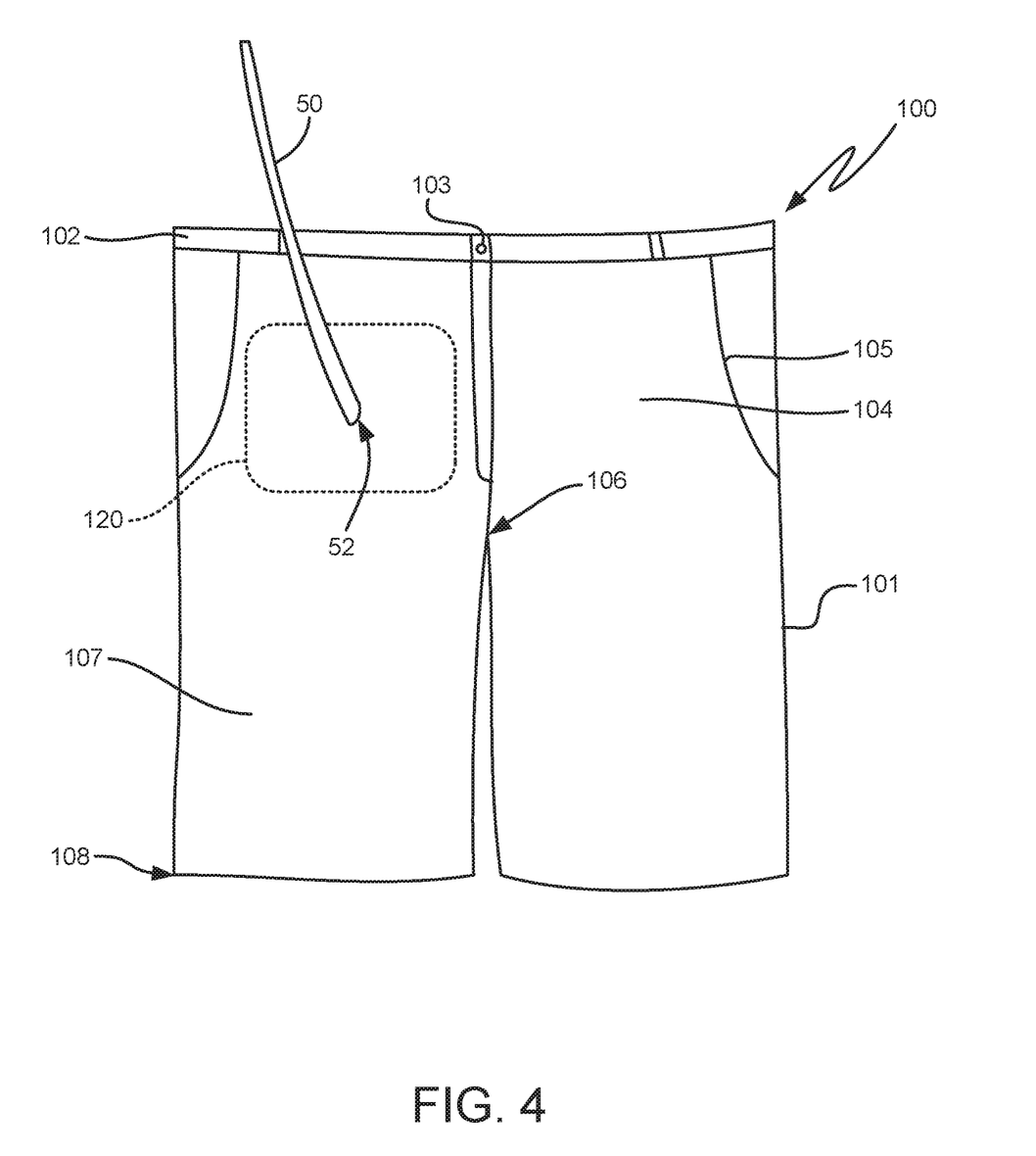
FIG. 4 is a front view of the example fishing garment system of FIG. 1 with the example gimbal plate of FIG. 2 in a pocket of a fabric garment of the example fishing garment system.
Figure 5:
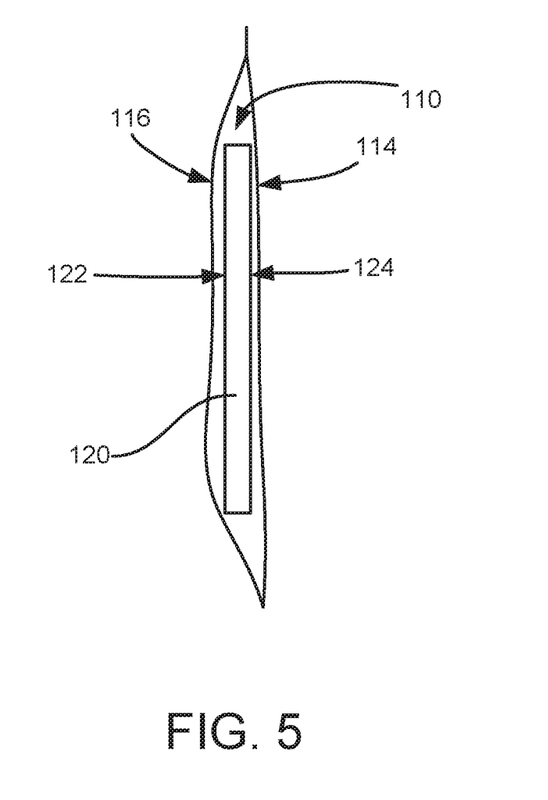
FIG. 5 is a side section view of a pocket of the example fishing garment system of FIG. 1 with the example gimbal plate of FIG. 2 positioned within the pocket.

FIG. 4 is a front view of fabric garment 101 with the gimbal plate 120 positioned within a pocket 110 (FIG. 5) of fabric garment 101. FIG. 5 is a side section view of pocket 110 of fabric garment 101 and gimbal plate 120 within pocket 110. Pocket 110 holds gimbal plate 120 such that gimbal plate 120 is supported within fabric garment 101. When gimbal plate 120 is within pocket 110, gimbal plate 120 is positioned such that the wearer of fabric garment 101 may rest the end 52 of the fishing rod 50 against gimbal plate 120, e.g., within recess 126. Thus, pocket 110 may advantageously position gimbal plate 120 for supporting the end 52 of the fishing rod 50 against the wearer of fishing garment system 100. When gimbal plate 120 includes support bar 127, fabric garment 101 may include a hole that allows the end 52 of the fishing rod 50 to pass through fabric garment 101 and rest against the support bar 127, e.g., in the manner shown in FIG. 8.

In the example embodiment shown in FIG. 4, pocket 110 is positioned within fabric garment 101 such that gimbal plate 120 is positioned, e.g., vertically, between waistband 102 and crotch 106 of fabric garment 101 when gimbal plate 120 is positioned within pocket 110. In addition, pocket 110 is positioned within fabric garment 101 such that gimbal plate 120 is positioned, e.g., laterally, between one of pockets 105 and the fly of fabric garment 101 when gimbal plate 120 is positioned within pocket 110. Thus, gimbal plate 120 may advantageously rest against an upper thigh of the wearer of fishing garment system 100.

The position and/or size of pocket 110 shown in FIG. 4 (corresponding to the location of gimbal plate 120 in FIG. 4) is provided by way of example only. Pocket 110 may be positioned at other suitable locations within fabric garment 101 in alternative example embodiments. For example, pocket 110 may be positioned, e.g., vertically, between crotch 106 and hem 108 of fabric garment 101 when gimbal plate 120 is positioned within pocket 110. Thus, gimbal plate 120 may advantageously rest against a middle and/or lower thigh of the wearer of fishing garment system 100 in alternative example embodiments. As another example, fabric garment 101 may not include the fly within rise 104, and pocket 110 may extend across rise 104 between hand pockets 105 within fabric garment 101. Thus, gimbal plate 120 may advantageously rest across (e.g., a majority) of the lower abdomen of the wearer of fishing garment system 100 in alternative example embodiments. In addition, multiple pockets 110 (FIG. 12) may be provided within fabric garment 101 in alternative example embodiments. Thus, the wearer of fishing garment system 100 may select one of the pockets 110 in which to position gimbal plate 120, e.g., to thereby allow the user to position gimbal plate 120 at one of the various desirable locations provided by pockets 110. In particular, depending upon whether the wearer of fishing garment system 100 is left or right handed, the wearer may position gimbal plate 120 in either the pocket 110 on the upper left thigh of the wearer or the pocket 110 on the upper right thigh of the wearer.

As shown in FIG. 4, gimbal plate 120 may not be visible from an exterior of fabric garment 101 when gimbal plate 120 is positioned within pocket 110. In particular, as shown in FIG. 5, fabric of fabric garment 101 may be positioned over gimbal plate 120 when gimbal plate 120 is positioned within pocket 110. For example, fabric garment 101 has an interior side 114 and an exterior side 116. Interior side 114 of fabric garment 101 faces towards the wearer of fishing garment system 100, and exterior side 116 of fabric garment 101 faces away from the wearer of fishing garment system 100. Gimbal plate 120 may be positioned below or under exterior side 116 of fabric garment 101 such that the fabric of fabric garment 101 obstructs a view of gimbal plate 120 by another when gimbal plate 120 is positioned within pocket 110. In such a manner, fishing garment system 100 may provide a discreet support for fishing rod 50 relative to known fishing gimbal belts. In particular, fishing garment system 100 may provide discreet support for fishing rod 50 when reeling in after losing bait or to remove seaweed.

Figure 6:
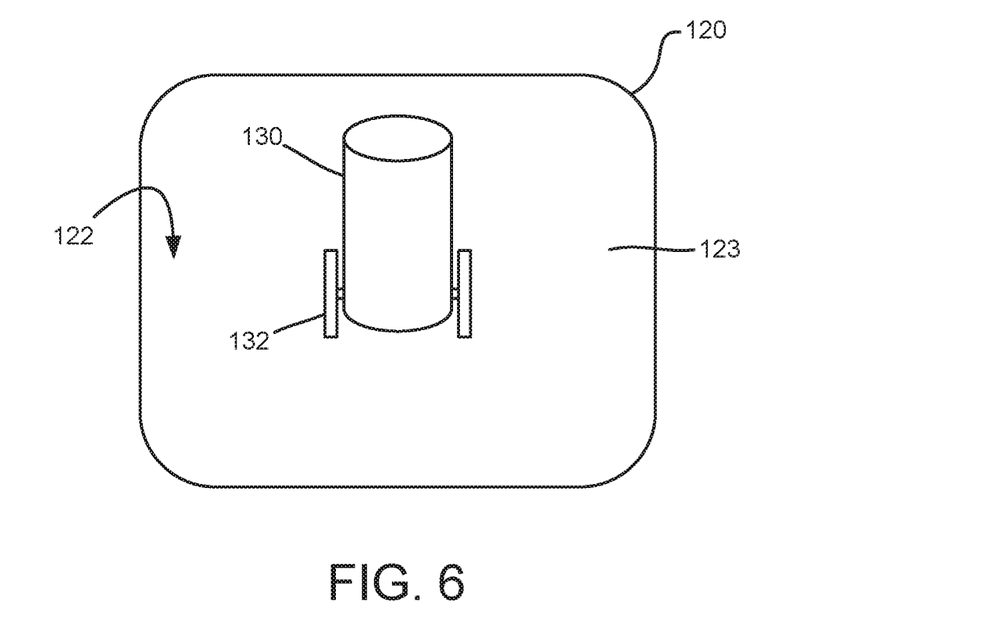
FIG. 6 is a front view of a gimbal plate according to another example embodiment of the present subject matter and that is configured for use in the example fishing garment system of FIG. 1.
Figure 7:
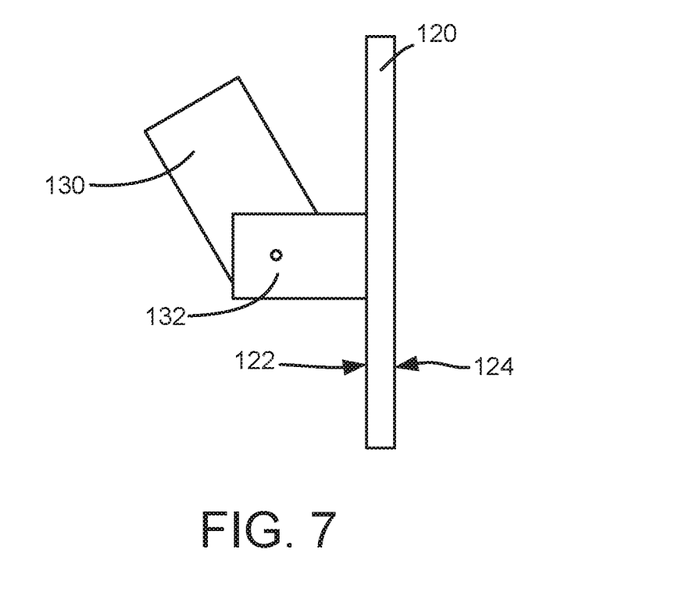
FIG. 7 is a side view of the example gimbal plate of FIG. 6.

FIG. 6 is a front view of gimbal plate 120 according to another example embodiment of the present subject matter. FIG. 7 is a side view of the example gimbal plate 120 of FIG. 6. As may be seen in FIGS. 6 and 7, fishing garment system 100 may include a socket 130. Socket 130 is mounted to gimbal plate 120. Socket 130 is configured for receipt of the end 52 of fishing rod 50. Thus, e.g., the wearer of fishing garment system 100 may position the end 52 of fishing rod 50 within socket 130. In certain example embodiments, socket 130 is rotatably mounted to gimbal plate 120 with a hinge 132. Thus, e.g., socket 130 may rotate relative to gimbal plate 120. In such a manner, the angle at which socket 130 supports fishing rod 50 on gimbal plate 120 may be advantageously adjusted by the wearer of fishing garment system 100.

Figure 8:
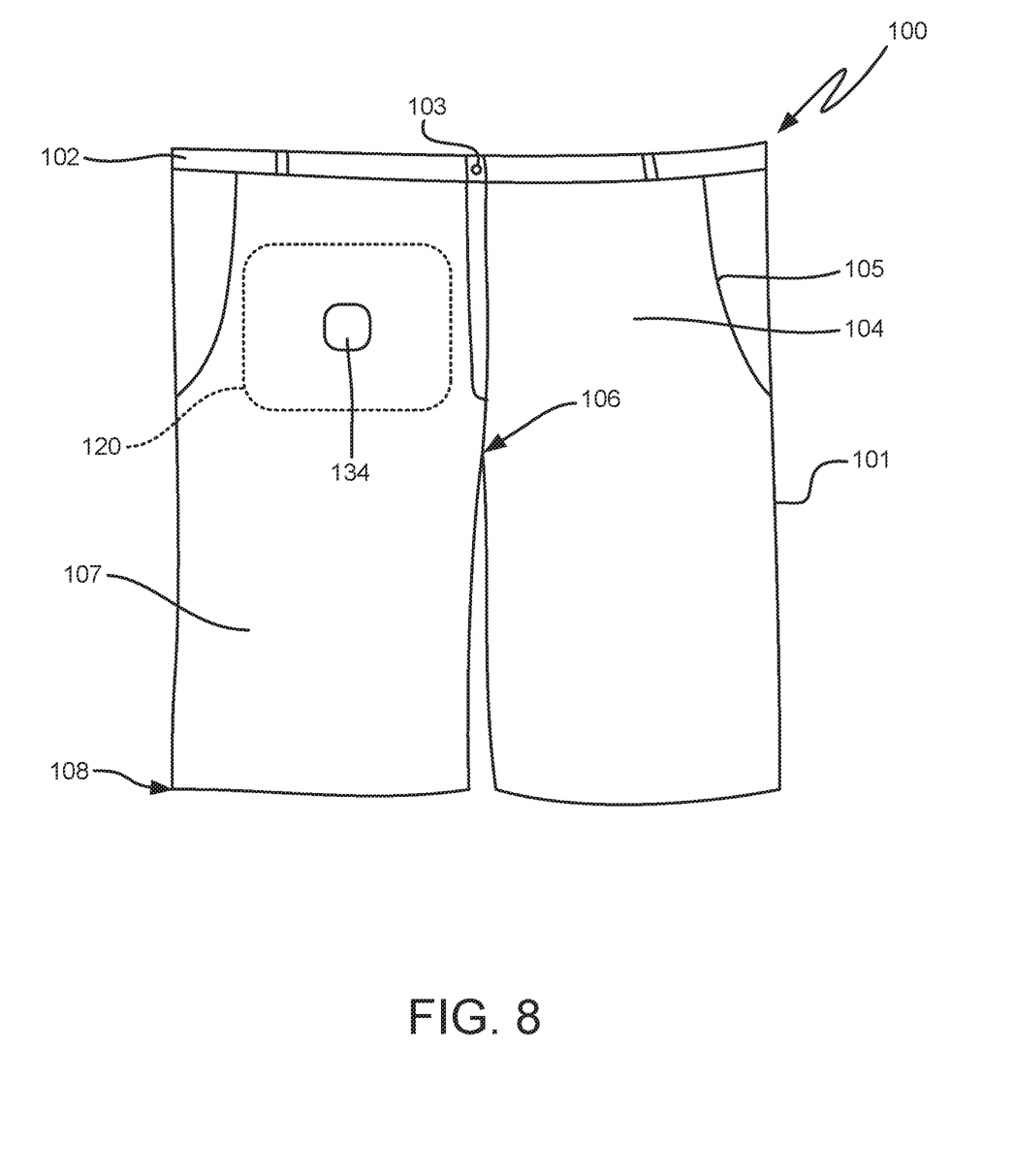
FIGS. 8 and 9 are front views of the example fishing garment system of FIG. 1 with the example gimbal plate of FIG. 6 in the pocket of the fabric garment.
Figure 9:
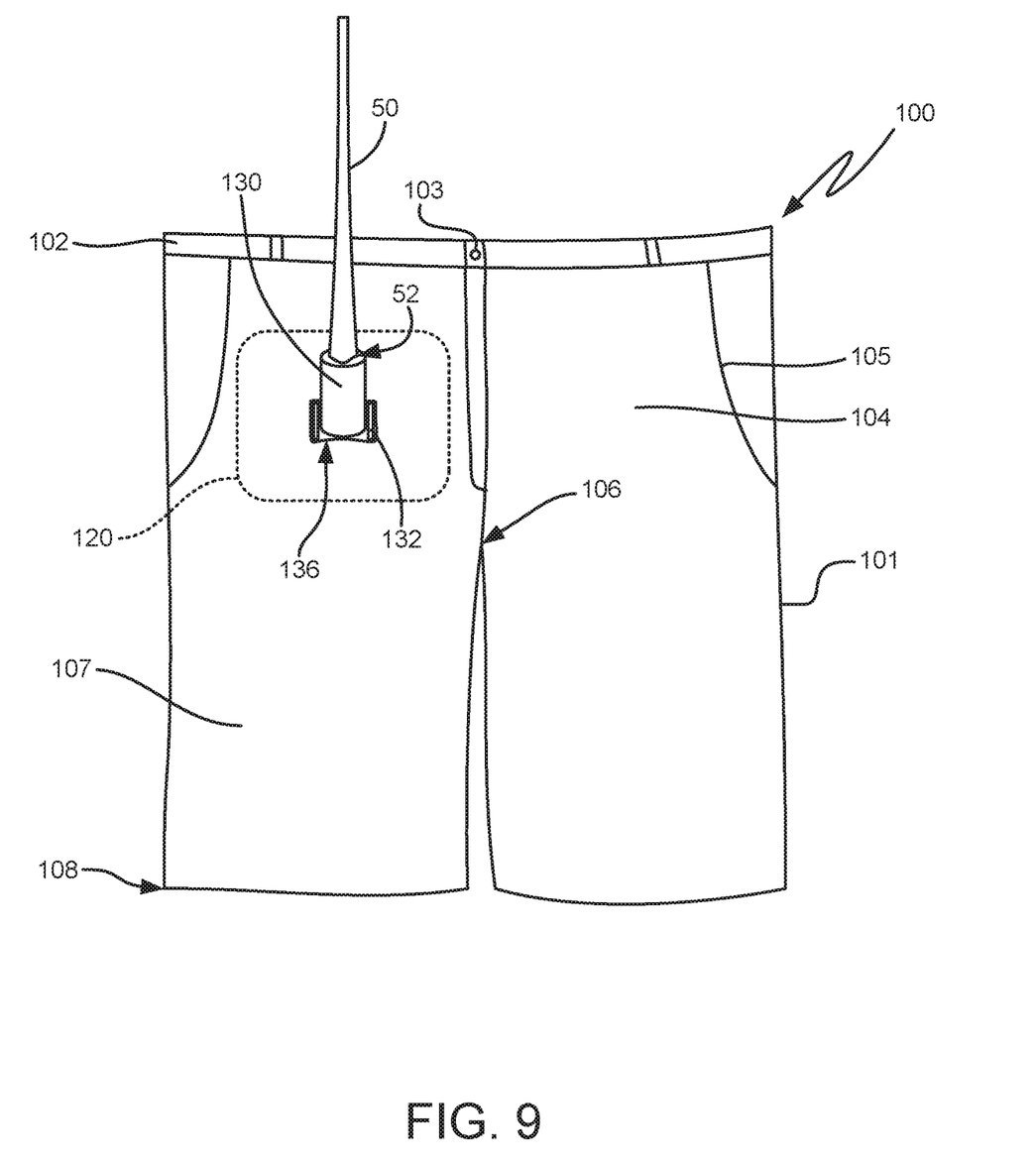
Figure 10:
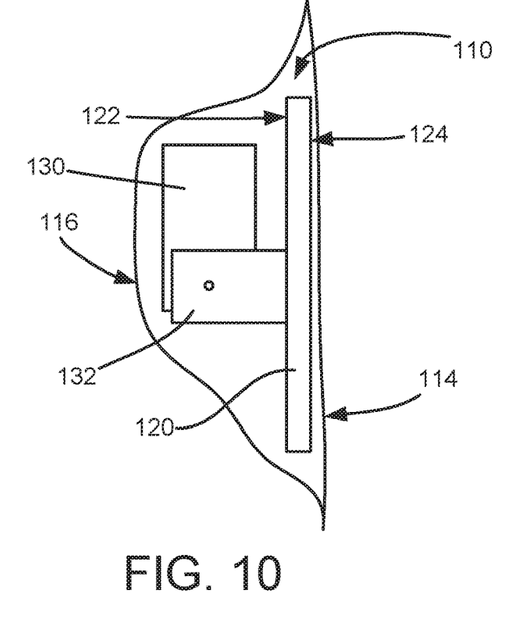
FIGS. 10 and 11 are side section views of the pocket of the example fishing garment system of FIG. 1 with the example gimbal plate of FIG. 6 positioned within the pocket of the fabric garment.
Figure 11:
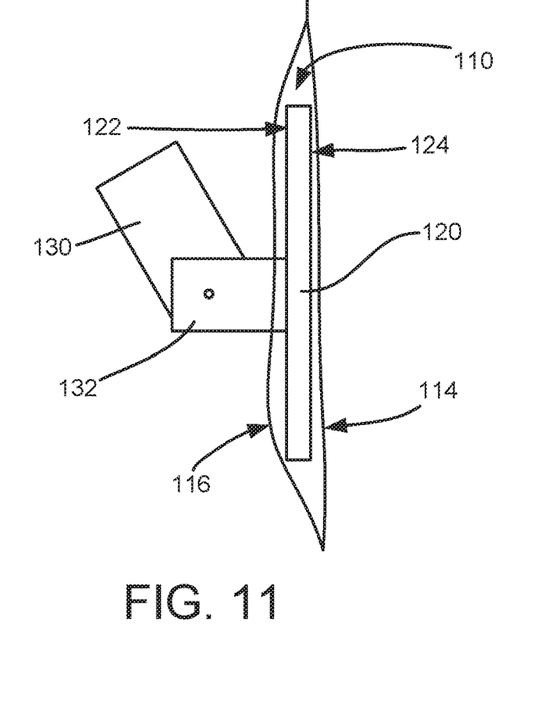

FIGS. 8 and 9 are front views of fishing garment system 100 with the gimbal plate of FIG. 6. FIGS. 10 and 11 are side section views of pocket 110 of fabric garment 101 with gimbal plate 120 of FIG. 6 positioned within pocket 110. As shown in FIGS. 9 and 11, socket 130 may extend from pocket 110 through fabric garment 101. In particular, fabric garment 101 defines a hole 136 that extends through fabric garment 101, e.g., from exterior side 116 of fabric garment 101 to pocket 110. Socket 130 may extend from gimbal plate 120 through hole 136 out of pocket 110. With socket 130 extending through hole 136, the wearer of fishing garment system 100 may position the end 52 of fishing rod 50 within socket 130 to support fishing rod 50 with gimbal plate 120.

When socket 130 extends through hole 136, socket 130 is positioned above or over exterior side 116 of fabric garment 101 such that the fabric of fabric garment 101 does not obstruct a view of socket 130 when gimbal plate 120 is positioned within pocket 110. However, gimbal plate 120 is within pocket 110 such that the support for fishing rod 50 provided by gimbal plate 120 and socket 130 is still more discreet than known fishing gimbal belts. Fabric garment 101 may also include a cover 134 that extends over hole 136 when socket 130 is positioned within pocket 110 as shown in FIG. 8. In alternative example embodiments, fabric garment 101 may include a zipper, a button, Velcro fastener, etc. for closing hole 136 and selectively obstructing the view of gimbal plate 120 and socket 130 within pocket 110, e.g., when gimbal plate 120 and socket 130 are not in use.

Figure 12:
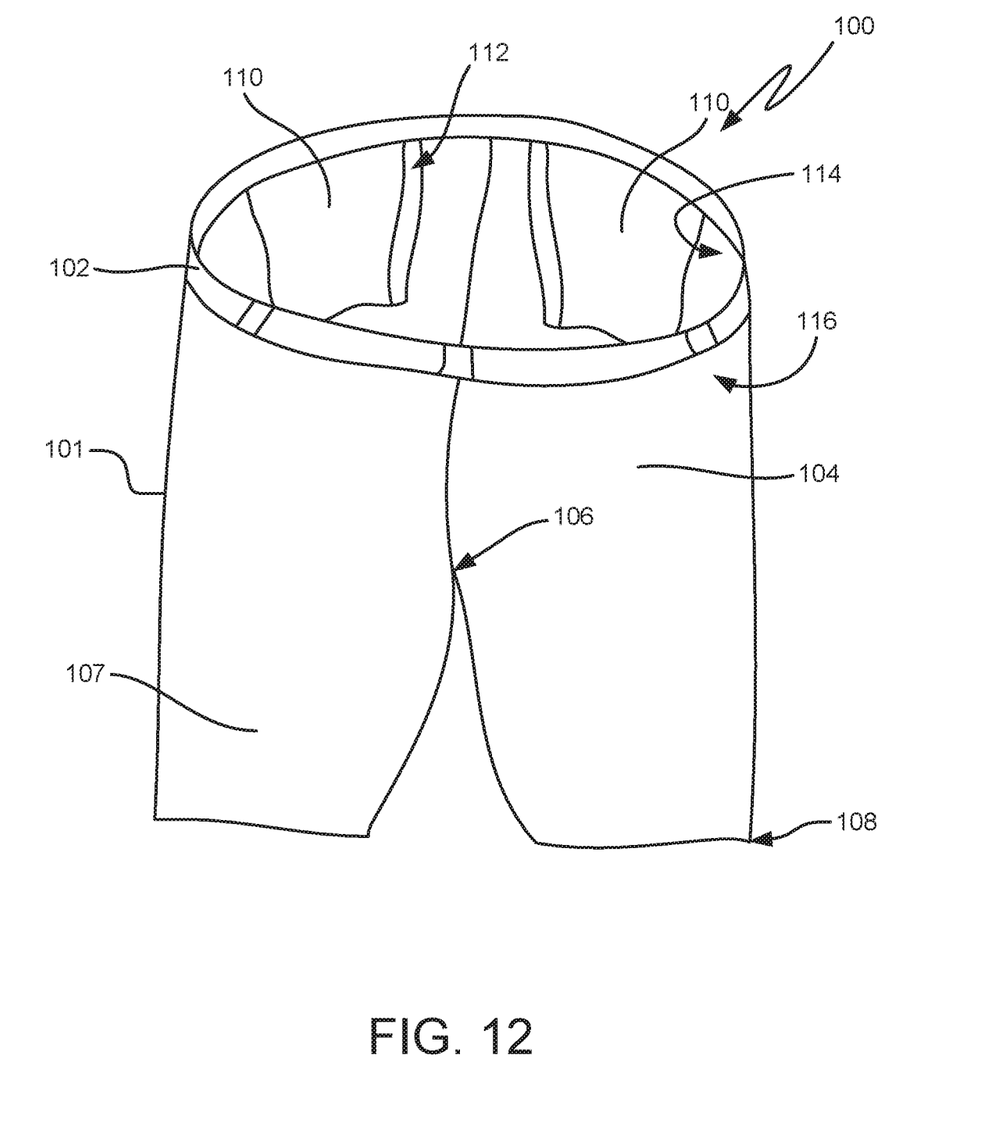
FIG. 12 is a rear, perspective view of the example fishing garment system of FIG. 1.

FIG. 12 is a rear, perspective view of fishing garment system 100. As may be seen in FIG. 12, pocket 110 has an opening 112, e.g., positioned at the interior side 114 of fabric garment 101. Gimbal plate 120 is selectively positioned within pocket 110 as noted above. Opening 112 allows insertion and removal of gimbal plate 120 from pocket 110. In particular, the wearer of fishing garment system 110 may insert gimbal plate 120 into pocket 110 through opening 112 when the wearer would like to utilize gimbal plate 120 to support fishing rod 50. Conversely, the wearer of fishing garment system 110 may remove gimbal plate 120 from pocket 110 through opening 112 when the wearer does not desire to use gimbal plate 120 to support fishing rod 50. Thus, fishing garment system 100 provides a discreet support for fishing rod 50 when needed, while also allowing fabric garment 101 to be worn as a normal garment without gimbal plate 120. Thus, fabric garment 101 may have a pleasant cosmetic appearance with and without gimbal plate 120 to provide a flexible garment for fishing and casual wear.

Figure 13:
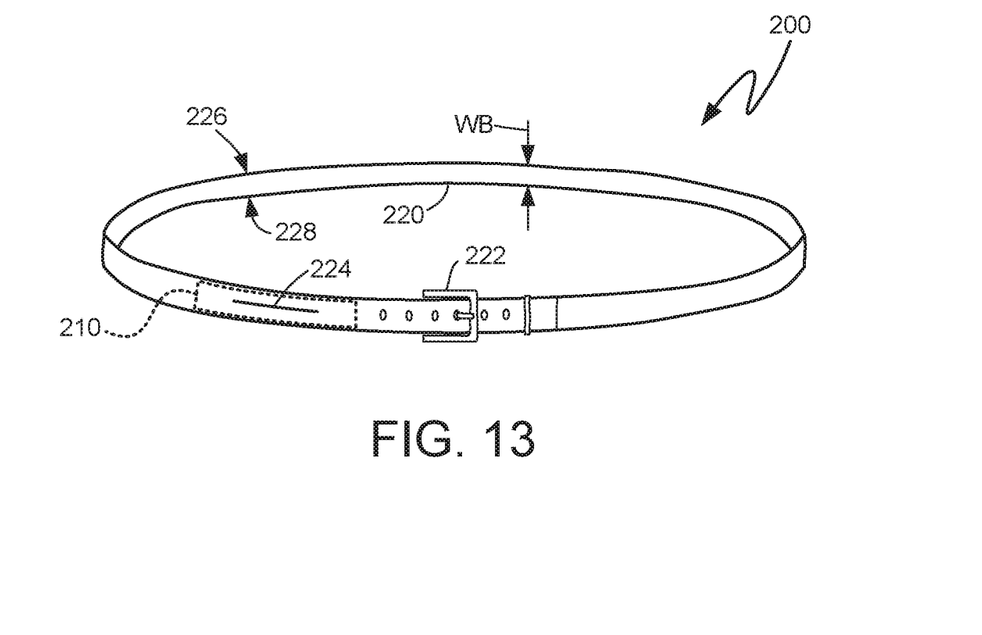
FIG. 13 is a perspective view of a belt according to an example embodiment of the present subject matter.

FIG. 13 is a perspective view of a belt 200 according to an example embodiment of the present subject matter. The belt 200 includes a gimbal plate 210. Belt 200 may include a pocket that is constructed in the same or similar manner to that described above for fabric garment 101 to support gimbal plate 210 and provide a discreet support for a fishing pole. In particular, belt 200 may provide discreet support for fishing rod 50 when reeling in after losing bait or to remove seaweed. In certain example embodiments, gimbal plate 210 may be permanently sewn into belt 200. Belt 200 may be constructed of or with leather, nylon, etc.

As shown in FIG. 13, belt 200 may include an elongated strap 220 and a buckle 222. Buckle 222 may be used to adjust a length of elongated strap 220, as is well understood. Elongated strap 220 also has a width WB between a top 226 and a bottom 228 of elongated strap 220. The width WB of elongated strap 220 may be less than one and a half inches (1.5"). Thus, elongated strap 220 may advantageously slide within belt loops of common garments, such as pants and shorts.

A support bar 224 is mounted to elongated strap 220, e.g., such that support bar 224 is offset from buckle 222 on elongated strap 220, between the top 226 and bottom 228 of elongated strap 220. Support bar 224 may be directly mounted to elongated strap 220, e.g., with rivets, screws, etc. Support bar 224 may also be indirectly mounted to elongated strap 220 by mounting support bar 224 to gimbal plate 210. Thus, the force applied to support bar 224 may be advantageously distributed across a wider area than when support bar 224 is directly mounted to elongated strap 220. Support bar 224 may be brass, aluminum, stainless steel or some other material with a pleasant cosmetic appearance.

Support bar 224 is positioned and oriented on elongated strap 220 such that support bar 224 is receivable within a gimbal on the end 52 of fishing rod 50 (FIG. 4). Thus, e.g., a wearer of belt 200 may conveniently support fishing rod 50 on support bar 224, e.g., while reeling in after losing bait or to remove seaweed. By mounting support bar 224 to elongated strap 220 between the top 226 and bottom 228 of elongated strap 220, support bar 224 may be advantageously be mounted to belt 200 that fits common belt loops on garments, such as pants or shorts, and belt 200 may be worn both while fishing and when not fishing without an awkward appearance. In particular, when support bar 224 is an attractive metal, such as described above, support bar 224 may provide both improve the cosmetic appearance of belt 200 and provide support for fishing rods.

Figure 14:
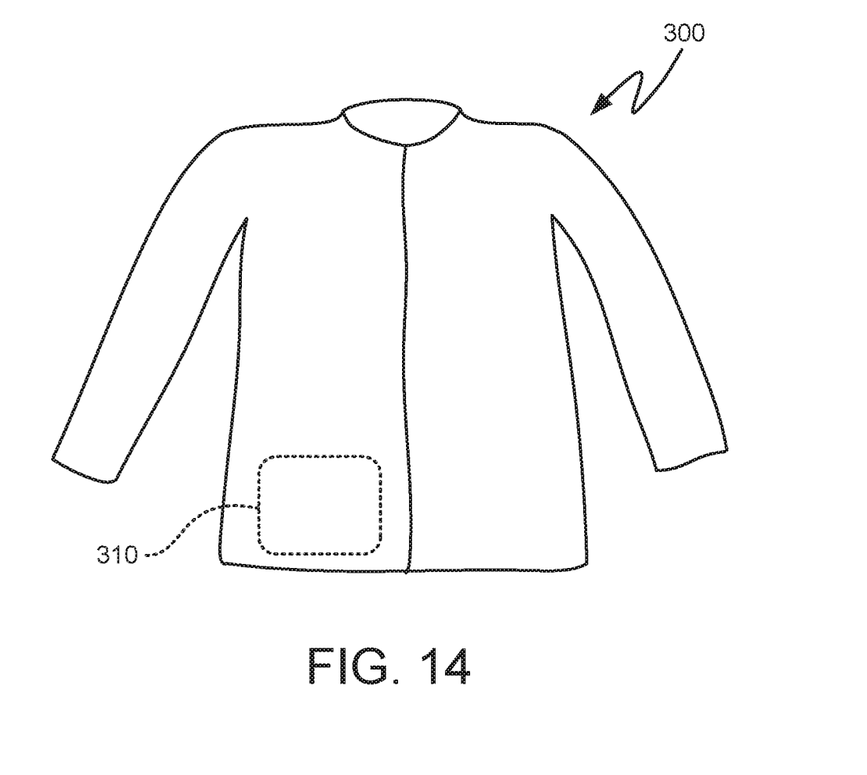
FIG. 14 is a front view of a fishing garment system according to another example embodiment of the present subject matter.

FIG. 14 is a front view of fishing garment system 300 according to another example embodiment of the present subject matter. Fishing garment system 300 is constructed in the same or similar manner to fishing garment system 100. However, the fabric garment is a shirt in the example embodiment shown in FIG. 14. A gimbal plate 310 of fishing garment system 300 may be positioned within a pocket at or adjacent a tail or bottom portion of the shirt. Thus, e.g., gimbal plate 310 may be positioned at or on a waist and/or upper thigh of a wearer of fishing garment system 300. Other locations for gimbal plate 310 in the shirt are also within the scope of the present subject matter.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fishing garment system, comprising:
a fabric garment having a pocket with an opening, the fabric garment configured to be worn by a user such that a portion of the user is received within the fabric garment, the pocket positioned within the fabric garment, the opening of the pocket positioned at an interior side of the fabric garment, the fabric garment also defining a hole separate from the opening of the pocket, the hole extending through the fabric garment from an exterior side of the fabric garment to the pocket; and a gimbal plate sized such that the gimbal plate is selectively positionable within the pocket of the fabric garment by inserting the gimbal plate through the opening of the pocket, the gimbal plate defining a recess, the gimbal plate comprising a support bar disposed within the recess, the support bar sized and oriented for receipt within a slot formed by a gimbal on a fishing rod, wherein the gimbal plate is positioned for supporting the fishing rod against a wearer of the fabric garment when the gimbal plate is disposed within the pocket of the fabric garment.

2. The fishing garment system of claim 1, wherein the fabric garment is a jacket, a pair of pants, a pair of shorts or a shirt.

3. The fishing garment system of claim 1, wherein the gimbal plate is not visible through the fabric garment when the gimbal plate is disposed within the pocket of the fabric garment.

4. The fishing garment system of claim 1, wherein the gimbal plate comprises a rigid plastic layer and a foam layer, the rigid plastic layer facing the exterior side of the fabric garment when the gimbal plate is disposed within the pocket of the fabric garment, the foam layer facing the interior side of the fabric garment when the gimbal plate is disposed within the pocket of the fabric garment.

5. The fishing garment system of claim 1, wherein the gimbal plate has an outer surface that faces the exterior side of the fabric garment when the gimbal plate is disposed within the pocket of the fabric garment, the outer surface of the gimbal plate having an area no less than four square inches and no greater than twenty square inches.

6. A fishing garment system, comprising:

a fabric garment having a pocket with an opening, the fabric garment configured to be worn by a user such that a portion of the user is received within the fabric garment, the pocket positioned within the fabric garment, the fabric garment also defining a hole separate from the opening, the hole extending through the fabric garment from an exterior side of the fabric garment to the pocket; and a gimbal plate disposed within the pocket of the fabric garment such that the gimbal plate is positioned for supporting a fishing rod, the gimbal plate removable from the pocket of the fabric garment through the opening of the pocket, the gimbal plate defining a recess, the gimbal plate comprising a support bar disposed within the recess, the support bar sized and oriented for receipt within a slot formed by a gimbal on the fishing rod, wherein the hole of the fabric garment is configured for receipt of an end of the fishing rod such that the end of the fishing rod is extendable through the fabric garment to the support bar of the gimbal plate via the hole.

7. The fishing garment system of claim 6, wherein the fabric garment is a pair of pants, a pair of shorts or a shirt.

8. The fishing garment system of claim 6, wherein the gimbal plate is not visible through the fabric garment.

9. The fishing garment system of claim 1, wherein an area of an inner surface of the gimbal plate is no less than four square inches and no greater than twenty square inches.

10. The fishing garment system of claim 1, wherein the gimbal plate has a height between a top and a bottom of the gimbal plate, the gimbal plate has a width between a first side and a second side of the gimbal plate, the height of the gimbal plate is no less than two inches and no greater than six inches, and the width of the gimbal plate is no less than two inches and no greater than twelve inches.

11. The fishing garment system of claim 1, wherein the gimbal plate has a thickness between an outer surface and an inner surface of the gimbal plate, and the thickness of the gimbal plate is no less than one eighth of an inch and no greater than one inch.

12. The fishing garment system of claim 1, wherein an inner surface of the gimbal plate is curved such that the inner surface of the gimbal plate is shaped complementary to a wearer of the fabric garment.

13. The fishing garment system of claim 1, wherein the fabric garment is a pair of pants or a pair of shorts, the pocket is positioned within the fabric garment vertically between a waistband and a crotch of the fabric garment, the pocket is positioned within the fabric garment laterally between a hand pocket and a fly of the fabric garment.

14. The fishing garment system of claim 1, wherein the pocket is one of a plurality of pockets, and the gimbal plate is selectively positionable within each pocket of the plurality of pockets.

15. The fishing garment system of claim 1, wherein fabric of the fabric garment is positioned over the gimbal plate when the gimbal plate is positioned within the pocket.

* * * * *